United States Patent
Gong et al.

(10) Patent No.: US 9,634,811 B2
(45) Date of Patent: *Apr. 25, 2017

(54) ACCESS POINT AND METHOD FOR COMMUNICATING WITH STATIONS IN ACCORDANCE WITH A MULTIPLE-ACCESS TECHNIQUE

(71) Applicant: Intel Corporation, Santa Clara, CA (US)

(72) Inventors: Michelle X. Gong, Sunnyvale, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,038

(22) Filed: Feb. 12, 2014

(65) Prior Publication Data

US 2014/0192742 A1   Jul. 10, 2014

Related U.S. Application Data

(63) Continuation of application No. 12/648,200, filed on Dec. 28, 2009, now Pat. No. 8,687,546.

(51) Int. Cl.
| | |
|---|---|
| *H04L 5/00* | (2006.01) |
| *H04L 1/16* | (2006.01) |
| *H04L 1/18* | (2006.01) |
| *H04W 74/06* | (2009.01) |
| *H04B 7/0452* | (2017.01) |

(52) U.S. Cl.
CPC .......... *H04L 5/0053* (2013.01); *H04L 1/1671* (2013.01); *H04L 1/1685* (2013.01); *H04L 1/1854* (2013.01); *H04W 74/06* (2013.01); *H04B 7/0452* (2013.01)

(58) Field of Classification Search
None
See application file for complete search history.

(56) References Cited

U.S. PATENT DOCUMENTS

| | | |
|---|---|---|
| 7,039,412 B2 | 5/2006 | Sandhu et al. |
| 7,054,296 B1 | 5/2006 | Sorrells et al. |
| 7,213,197 B2 | 5/2007 | Jacobsen et al. |
| 7,245,879 B2 | 7/2007 | Sadri et al. |

(Continued)

FOREIGN PATENT DOCUMENTS

| | | |
|---|---|---|
| CN | 102111201 A | 6/2011 |
| CN | 104270822 A | 1/2015 |

(Continued)

OTHER PUBLICATIONS

"U.S. Appl. No. 12/648,200, 312 Amendment filed Aug. 9, 2013", 10 pgs.

(Continued)

*Primary Examiner* — Brandon Renner
(74) *Attorney, Agent, or Firm* — Schwegman Lundberg & Woessner, P.A.

(57) ABSTRACT

According to various embodiments, a computer-implemented method is disclosed that allows an AP to efficiently poll various information from STAs belonging to a SDMA group. Each STA may transmit uplink frames using uplink SDMA mechanism.

50 Claims, 3 Drawing Sheets

(56) References Cited

U.S. PATENT DOCUMENTS

| | | |
|---|---|---|
| 7,263,651 B2 | 8/2007 | Xia et al. |
| 7,286,609 B2 | 10/2007 | Maltsev et al. |
| 7,321,614 B2 | 1/2008 | Jacobsen et al. |
| 7,373,112 B2 | 5/2008 | Stephens et al. |
| 7,394,858 B2 | 7/2008 | Sadowsky et al. |
| 7,408,908 B2 | 8/2008 | Li et al. |
| 7,460,494 B2 | 12/2008 | Sandhu |
| 7,567,612 B2 | 7/2009 | Stephens et al. |
| 7,672,365 B2 | 3/2010 | Jacobsen et al. |
| 7,738,579 B2 | 6/2010 | Sadowsky et al. |
| 7,755,485 B2 | 7/2010 | Howard et al. |
| 7,822,135 B2 | 10/2010 | Sadowsky et al. |
| 7,826,798 B2 | 11/2010 | Stephens et al. |
| 7,839,836 B2 | 11/2010 | Stephens et al. |
| 7,885,346 B2 | 2/2011 | Sadowsky et al. |
| 8,687,546 B2 | 4/2014 | Gong et al. |
| 2003/0198244 A1 | 10/2003 | Ho et al. |
| 2004/0105412 A1 | 6/2004 | He et al. |
| 2004/0184475 A1 | 9/2004 | Meier |
| 2005/0002355 A1 | 1/2005 | Takano |
| 2005/0031047 A1 | 2/2005 | Maltsev et al. |
| 2005/0032478 A1 | 2/2005 | Stephens et al. |
| 2005/0032514 A1 | 2/2005 | Sadri et al. |
| 2005/0034053 A1 | 2/2005 | Jacobsen et al. |
| 2005/0041611 A1 | 2/2005 | Sandhu |
| 2005/0068916 A1 | 3/2005 | Jacobsen et al. |
| 2005/0129101 A1 | 6/2005 | Stepehens et al. |
| 2005/0135410 A1 | 6/2005 | Stephens |
| 2005/0136910 A1 | 6/2005 | Li et al. |
| 2005/0136933 A1 | 6/2005 | Sandhu |
| 2005/0141495 A1 | 6/2005 | Lin et al. |
| 2005/0144307 A1 | 6/2005 | Li et al. |
| 2005/0147076 A1 | 7/2005 | Sadowsky et al. |
| 2005/0147115 A1 | 7/2005 | Li et al. |
| 2005/0154958 A1 | 7/2005 | Xia et al. |
| 2005/0157695 A1 | 7/2005 | Stephens et al. |
| 2005/0157734 A1 | 7/2005 | Li et al. |
| 2006/0114826 A1 | 6/2006 | Brommer |
| 2006/0203838 A1 | 9/2006 | Howard et al. |
| 2006/0256743 A1 | 11/2006 | Lee et al. |
| 2007/0058605 A1* | 3/2007 | Meylan et al. ............ 370/346 |
| 2007/0110149 A1 | 5/2007 | Langley et al. |
| 2007/0153757 A1* | 7/2007 | Kim ............ H04L 1/1614 370/338 |
| 2007/0274256 A1 | 11/2007 | Murai |
| 2007/0291639 A1 | 12/2007 | Jacobsen et al. |
| 2008/0181162 A1 | 7/2008 | Stephens et al. |
| 2008/0198760 A1 | 8/2008 | Stephens et al. |
| 2008/0253471 A1 | 10/2008 | Sadowsky et al. |
| 2009/0042582 A1 | 2/2009 | Wang |
| 2009/0147879 A1 | 6/2009 | Sandhu |
| 2009/0245405 A1 | 10/2009 | Sadowsky et al. |
| 2009/0252257 A1 | 10/2009 | Sadowsky et al. |
| 2009/0276674 A1 | 11/2009 | Wei et al. |
| 2010/0014448 A1* | 1/2010 | Wentink ............ H04L 1/1614 370/311 |
| 2010/0098181 A1 | 4/2010 | Jacobsen et al. |
| 2010/0195545 A1 | 8/2010 | Sadowsky et al. |
| 2011/0013524 A1 | 1/2011 | Stephens et al. |
| 2011/0038262 A1* | 2/2011 | Nabetani ............ H04L 1/1607 370/232 |
| 2011/0096856 A1 | 4/2011 | Sadowsky et al. |
| 2011/0158159 A1 | 6/2011 | Gong et al. |
| 2011/0195545 A1 | 8/2011 | Wang |

FOREIGN PATENT DOCUMENTS

| | | |
|---|---|---|
| EP | 2117152 | 11/2009 |
| EP | 2520128 A2 | 11/2012 |
| JP | 2004200878 A | 7/2004 |
| JP | 2005094156 A | 4/2005 |
| JP | 2007502074 A | 2/2007 |
| JP | 2007502079 A | 2/2007 |
| JP | 2007158529 A | 6/2007 |
| JP | 2007221522 A | 8/2007 |
| JP | 2008532332 A | 8/2008 |
| JP | 2009060621 A | 3/2009 |
| WO | WO-2005015812 A1 | 2/2005 |
| WO | WO-2011090567 A3 | 7/2011 |

OTHER PUBLICATIONS

"U.S. Appl. No. 12/648,200, Final Office Action mailed Feb. 21, 2013", 21 pgs.

"U.S. Appl. No. 12/648,200, Non Final Office Action mailed Sep. 17, 2012", 17 pgs.

"U.S. Appl. No. 12/648,200, Notice of Allowance mailed Jun. 4, 2013", 8 pgs.

"U.S. Appl. No. 12/648,200, Notice of Allowance mailed Nov. 26, 2013", 7 pgs.

"U.S. Appl. No. 12/648,200, Response filed Jan. 17, 2013 to Non Final Office Action mailed Sep. 17, 2012", 12 pgs.

"U.S. Appl. No. 12/648,200, Response filed May 21, 2013 to Final Office Action mailed Feb. 21, 2013", 8 pgs.

"Chinese Application Serial No. 201010625158.X, Response filed Mar. 18, 2014 to Office Action mailed Aug. 21, 2013", w/English claims, 13 pgs.

"Chinese Application Serial No. 201010625158.X, Office Action mailed Feb. 5, 2013", w/English translation, 21 pgs.

"Chinese Application Serial No. 201010625158.X, Office Action mailed Aug. 21, 2013", English translation, 8 pgs.

"Chinese Application Serial No. 201010625158.X, Response filed Jun. 20, 2013 to Office Action mailed Feb. 5, 2013", w/English claims, 10 pgs.

"Chinese Application Serial No. 201010625158.X, Response filed Nov. 5, 2013 to Office Action mailed Aug. 21, 2013", w/English claims, 16 pgs.

"European Application Serial No. 10844166.8, Office Action mailed Aug. 3, 2012", 2 pgs.

"European Application Serial No. 10844166.8, Response filed Jan. 31, 2013 to Office Action mailed Aug. 3, 2012", 6 pgs.

"International Application Serial No. PCT/US2010/059190, International Preliminary Report on Patentability mailed Jul. 12, 2012", 6 pgs.

"Japanese Application Serial No. 2012-547094, Office Action mailed May 20, 2014", w/English translation, 5 pgs.

"Japanese Application Serial No. 2012-547094, Office Action mailed Sep. 3, 2013", w/English translation, 10 pgs.

"Japanese Application Serial No. 2012-547094, Response filed Jan. 6, 2014 to Office Action mailed Sep. 3, 2013", w/English claims, 15 pgs.

International Search Report and Written Opinion mailed Aug. 26, 2011 for PCT/US2010/059190.

"European Application Serial No. 10844166.8, Extended European Search Report mailed Nov. 6, 2014", 10 pgs.

"European Application Serial No. 16191591.3, Extended European Search Report mailed Jan. 18, 2017."

* cited by examiner

ACCESS POINT AND METHOD FOR COMMUNICATING WITH STATIONS IN ACCORDANCE WITH A MULTIPLE-ACCESS TECHNIQUE

CROSS-REFERENCE TO RELATED APPLICATIONS

This Application is a continuation of U.S. patent application Ser. No. 12/648,200, filed Dec. 28, 2009, now issued as U.S. Pat. No. 8,687,546, the entire contents of which are hereby incorporated by reference.

BACKGROUND

This disclosure relates generally to the field of wireless communication, and in particular to communication management in a network using uplink Spatial Division Multiple Access (SDMA).

Uplink SDMA (UL SDMA) is an advanced signal transmission technique used in wireless communication systems where multiple mobile stations (STAs) are allowed to communicate with an access point (AP) having multiple antenna elements sharing a same transmission time and frequency. The AP is configured to receive, via multiple spatially apart antenna elements, combined signals simultaneously transmitted from a plurality of STAs and separate the received signals into independent signals from each STA through appropriate signal processing. Also, the AP may transmit directional radio signals via multiple spatially apart antenna elements towards intended STAs to suppress interference and increase signal-to-noise ratio.

One of the standardized technologies that employs UL SDMA is the IEEE 802.16 for Wireless Metropolitan Area Network (WiMAX). In a WiMAX communications network, an AP combines a couple of STAs to create a SDMA group. The STAs belonging to a same group may transmit signals at a same time in a same frequency band using UL SDMA mechanism. Existing systems use polling procedures based on a TDMA MAC, resulting in inefficient polling procedures.

DETAILED DESCRIPTION

Definitions

Figure 1:
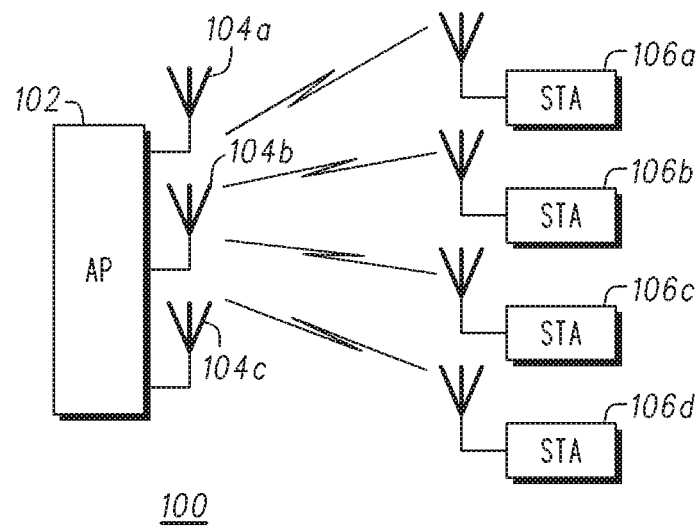
FIG. 1 illustrates an example network architecture in accordance with various aspects of the present disclosure.

Access Point (AP): Any entity that has a station (STA) functionality and provides access to the distribution services, via the WM for associated STAs.

Mobile Station (MS): A type of STA that uses network communications while in motion.

Station (STA): Any device that contains an IEEE 802.11-conformant medium access control (MAC) and physical layer (PHY) interface to the wireless medium (WM).

Frame: A basic unit for data transmission between stations. "Frame" is interchangeably used with "packet".

Wireless medium (WM): The medium used to implement the transfer of protocol data units (PDUs) between peer physical layer (PHY) entities of a wireless local area network (LAN).

Interframe space (IFS): A predetermined time interval between frames defined in the IEEE 802.11-2007 specification, where five different IFS s are defined in the IEEE 802.11 to provide priority levels for access to the wireless medium.

Uplink Spatial Division Multiple Access (UL SDMA): A uplink multiple access mechanism where a plurality of STAs may transmit signals using same frequency band and same transmission time and in turn an AP receives combined signals from the plurality of STAs via multiple spatially separate antenna elements. The received combined signals are separated at the AP through appropriate processing.

Description

Various embodiments disclosed herein relate to a computer-implemented method that allows an AP to efficiently poll various information from STAs each belonging to a SDMA group and capable of transmitting various types of MAC frames using uplink SDMA mechanism.

According to various embodiments, a computer-implemented method of this disclosure may be used to transmit a group polling frame including one or more group identifiers that identify either a SDMA group or wireless devices belonging to a SDMA group. The group polling frame either may be sent to all of the SDMA groups at once or may be sent to each SDMA sequentially. The group identifier is included in the polling frame in a particular order. Each STA may transmit an acknowledgement frame to signify successful receipt of the group polling frame at a timing determined based on the order of the group identifiers. The timing when the acknowledgement frame is transmitted is determined further based on the length of the acknowledgement frame and/or the length of a predetermined interval period defined between the group polling frame and the acknowledgement frame.

According to various embodiments, each STA with buffered traffic may include a buffered traffic status such as a request for a transmission right and/or queue size of buffered traffic in the acknowledgement frame. Each STA belonging to a particular SDMA group may transmit the acknowledgement frame simultaneously with other STAs belonging to the same SDMA group, for example, using uplink SDMA mechanism. In response to the acknowledgement frame, the AP may grant a transmission right to the requesting STA or the group to which the requesting STA belongs to. The requesting STA receives a polling frame including a particular transmission right granted to each of the wireless devices belonging to the first group. The transmission right may include a TXOP limit value. A same TXOP limit may be assigned to each of the STAs belonging to a same SDMA group. The requesting STA may transmit the buffered traffic during a period determined based on the TXOP limit value. The buffered data may be transmitted simultaneously with other buffered data to be transmitted from other STAs belonging to the same SDMA group using, for example, SDMA mechanism.

According to various embodiments, a computer-implemented method of this disclosure may also be used to transmit a polling frame including a transmission right from an AP to one or more STAs belonging to a SDMA group. The STAs may transmit an acknowledgement frame during a period determined based on the transmission right. The STAs may transmit the acknowledgement frame simultaneously with other STAs belonging to the same SDMA group using, for example, SDMA mechanism.

According to various embodiments, a computer-implemented method of this disclosure may also be used to transmit, from an AP to a group of STAs, a polling frame including a transmission right granted to each of the wireless devices belonging to the group. The AP may receive a plurality sets of buffered traffic simultaneously transmitted from at least one of the wireless devices belonging to the group using, for example, SDMA mechanism. The AP may transmit to the STAs acknowledgement frames to signify successful receipt of the transferred buffered data using downlink SDMA or downlink OFDMA.

Thus, the AP may poll associated STAs each belonging to a SDMA group in an efficient matter. The polling may be conducted either to solicit buffered traffic status or CF-ACK from associated STAs. The polling may also be conducted for uplink transmission of buffered data.

FIG. 1 illustrates an example architecture of a system 100 in accordance with various aspects of the present disclosure. The system 100 may include AP 102 configured to wirelessly communicate with associated STAs 106a, 106b, 106c and 106d (hereinafter "STA 106") via multiple spatially separated antenna elements 104a-104c. In this example, we assume STAs 106a and 106b belong to SDMA Group 1; and STAs 106c and 106d belong to SDMA Group 2. STAs 106a and 106b may simultaneously transmit radio signals to AP 102 using same frequency band and same transmission time using, for example, UL SDMA mechanism. Similarly, STAs 106c and 106d may simultaneously transmit radio signals to AP 102. AP 102 may receive the signals simultaneously transmitted from the STAs via the antenna elements 104a-104c and separate the received signals into a plurality of individual signals each corresponding to the transmission signal from each STA. AP 102 may communicate with STA 106 various types of frames that may be used to coordinate schedules for frame transmissions between AP 102 and STA 106. AP 102 may be configured as an Access Point (AP) in the IEEE 802.11 standard or other standards that may employ UL SDMA. Although two SDMA groups each including two STAs is shown in FIG. 1, the system may include more SDMA groups and each SMDA group may include more than two STAs. The number of STAs included in one SDMA group is limited by the number of antenna elements at AP 102.

Figure 2:
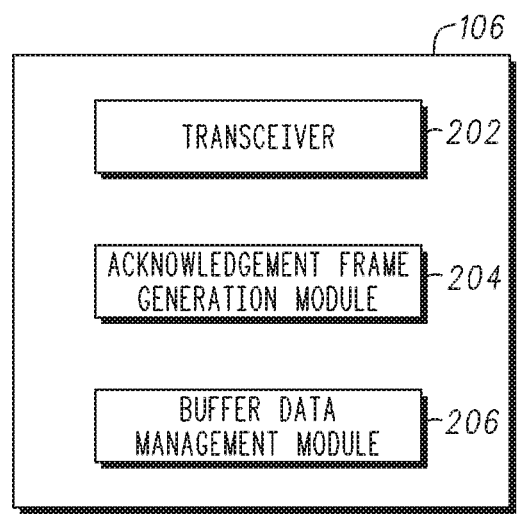
FIG. 2 is a block diagram illustrating an example STA, according to an embodiment.

FIG. 2 is a block diagram illustrating an example STA 106 in accordance with various aspects of the present disclosure. STA 106 may include, among others, a transceiver 202, an acknowledgment frame generation module 204 and buffered data management module 206. Transceiver 202 may transmit to and receive various communications from AP 102 via the wireless medium. For example, transceiver 202 may receive from AP 102 various communications, including a group polling and polling frames; and transmit to AP 102 various communications, including a CF-ACK and and A-MPDU+CF-ACK frames. The group polling frame may be transmitted by use of either broadcast address or multicast address. The group polling frame may include one or more group identifiers each of which may identify one of SDMA groups created for SDMA communications. Additionally or alternatively, the group polling frame may include STA Association identifiers (AIDs) each of which may identify one of STAs belonging to one of the STA groups. In the group polling frame, the group identifiers may be arranged in a particular order. The order of the group identifiers determines the order with which each STA identified by each group identifier is permitted to transmit the CF-ACK frames. Based on the order of the group identifiers, acknowledgment frame generation module 204 may determine the timing when STA 106 is allowed to transmit its a CF-ACK frame to AP 102. STA 106 may buffer traffic to be transmit other STAs and the CF-ACK frame may include information on buffered traffic status such as TXOP duration request and/or queue size of such buffered traffic. The group polling frame may be referred to as CF-Group Poll frame hereinafter.

According to various embodiments, upon the receipt of the CF-ACK frames from each STA 106, AP 102 may use the obtained TXOP duration requests and/or the queue sizes to determine TXOP duration to be assigned to each requesting STA. The same TXOP duration may be assigned to each STA belonging to a same SDMA group. In this example, a particular TXOP duration may be commonly assigned to STAs 106a and 106b; and a different particular TXOP duration may be commonly assigned to STAs 106c and 106d. Once determined, AP 102 may transmit to STA 106 a CF-Poll frame specifying TXOP duration assigned to the STA 106. The CF-Poll frame may be multicast to each STA 106 belonging to a same SDMA group. According to various embodiments, buffered data management module 206 may be configured, in conjunction with transceiver 202, to transmit buffered traffic associated with the TXOP duration request or queue size from a queue during the time limit indicated by the assigned TXOP duration.

Figure 3:
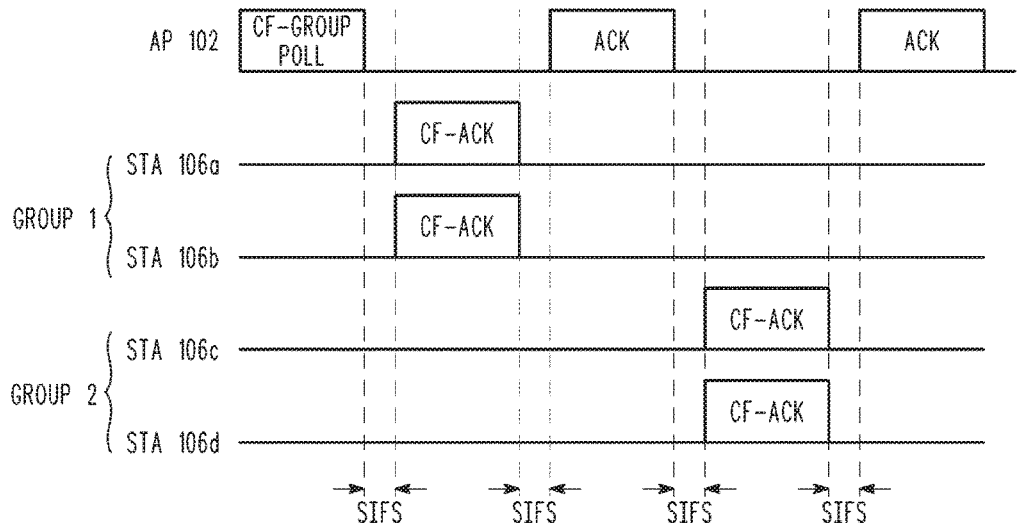
FIG. 3 is a timing chart illustrating example procedures for polling STAs to solicit buffered traffic status in accordance with various aspects of the present disclosure.

FIG. 3 is a timing chart illustrating example procedures for polling STAs to solicit buffered traffic status in accordance with various aspects of the present disclosure. The various processing operations depicted in the flow diagram of FIG. 6 (and in the other drawing figures) are described in greater detail herein. The described operations for a flow diagram may be accomplished using some or all of the system components described in detail above and, in some embodiments, various operations may be performed in different sequences. In other embodiments, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

The procedures illustrated in FIG. 3 utilizes some frame organizations specified in the hybrid coordination function controlled channel access (HCCA) protocol. The HCCA protocol is, as defined in the IEEE 802.11, the channel access mechanism utilized by the hybrid coordinator (HC) to coordinate contention-free media use by QoS STAs for downlink unicast, uplink, and direct-link transmissions. However, the IEEE 802.11 does not support the use of SDMA. The procedures illustrated in FIG. 3 provides an embodiment to support SDMA based on HCCA. Although the following description uses several frame formats defined in HCCA, it should be noted that embodiments of this disclosure should not be limited to HCCA based contention-free coordination. Rather, a method of this disclosure may be applied to any kind of protocols that may use polling mechanism to coordinate media use.

To begin with, a CF-Group Poll frame is transmitted from AP 102 to STAs 106a, 106b, 106c and 106d. As previously noted, the CF-Group Poll frame may include one or more group identifiers that identify one of the SDMA groups or STAs. The CF-Group Poll frame either may be sent once to poll from all SDMA groups or may be sent once to poll from each SDMA group. In this example, the CF-Group Poll frame includes two group identifiers each of which identifies SDMA Group 1 and SDMA Group 2 in this order. If STAs 106a and 106b correctly receive the CF-Group Poll frame, STAs 106a and 106b may commence to transmit CF-ACK frames to AP 102 a SIFS after the receipt of the CF-Group Poll frame because the group identifier of SDMA Group 1 is arranged as the first group in the CF-Group Poll frame. STAs 106a and 106b may have buffered traffic to be transmitted to other STAs. The status of the buffered traffic may be embedded in the QoS control field of the MAC header of the CF-ACK frame. As previously noted, the status of the buffered traffic may include the TXOP duration request and/or queue size of the buffered traffic. The CF-ACK frames are transmitted at a pre-determined robust data rate. The CF-ACK frames may be transmitted sequentially using Enhanced Distributed Channel Access (EDCA) or simultaneously using UL SDMA at a pre-determined robust data rate.

In parallel with the above CF-ACK transmission procedures in STAs 106a and 106b, STAs 106c and 106d from SDMA Group 2 determines that they should wait for a certain duration calculated as SIFS*3+Tx_Time(CF-ACK)+Tx_Time(ACK). It should be noted that STAs 106c and 106d may predict the timing when they are allowed to transmit CF-ACK because each of the CF-ACK frame is a fixed-length frame and transmitted at a pre-determined data rate. If there were SDMA Group 3 which are arranged as the third group in the sequence of SDMA groups in the CF-Group Poll frame, STAs from SDMA Group 3 shall wait for the duration calculated as SIFS*5+Tx_Time(CF-ACK)*2+Tx_Time(ACK)*2.

In response to the CF-ACK frame from STAs 106a and 106b, AP 102 may commence to transmit an ACK frame to STAs 106a and 106b a SIFS after the receipt of the CF-ACK. The RA field of the ACK frame may be set to the multicast address corresponding to SDMA Group 1. The ACK frame may also be sent using downlink SDMA to STAs 106a and 106b. Thus, the polling procedures for SDMA Group 1 is completed. Subsequently, STAs 106c and 106d may commence to transmit their CF-ACK frames to AP 102 because the duration determined based on the previously-noted equation has elapsed. In response to the CF-ACK frame, AP 102 may transmit an ACK frame to STAs 106c and 106d a SIFS after the receipt of the CF-ACK. Thus, AP 102 may obtain various information such as TXOP duration request or queue size from each of associated STAs from multiple SDMA groups in an efficient matter.

Subsequently, AP 102 may determine TXOP duration to be assigned to each SDMA group based on the received TXOP duration requests and/or queue sizes. For example, AP 102 may transmit to STAs 106a and 106b a CF-Poll frame specifying TXOP duration assigned to the SDMA Group 1. STAs 106a and 106b may transmit respective buffered traffic simultaneously with each other using UL SDMA. Each of STAs 106a and 106b are required to complete the transmission within the time limit indicated by the received TXOP duration.

Figure 4:
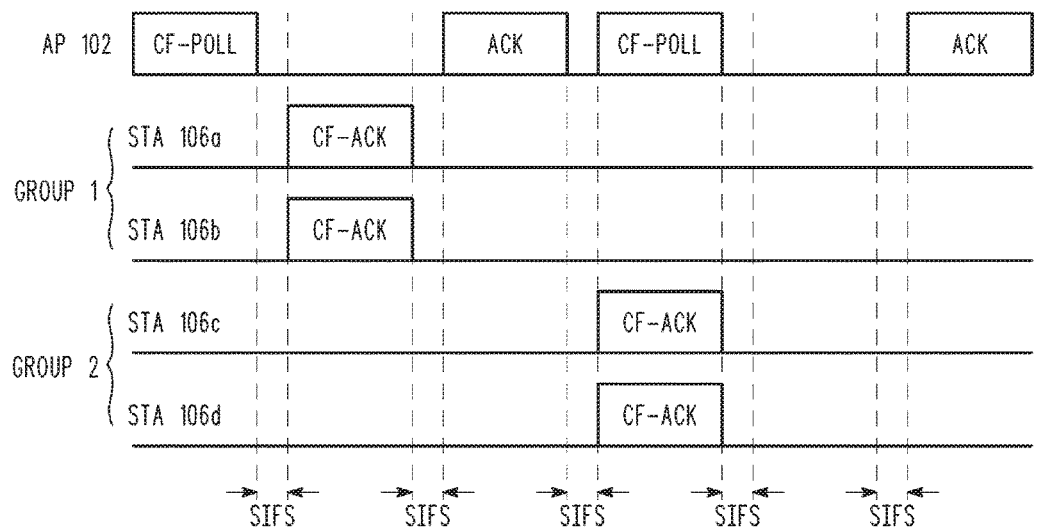
FIG. 4 is a timing chart illustrating example procedures for polling STAs to solicit CF-ACK in accordance with various aspects of the present disclosure.

FIG. 4 illustrates a timing chart illustrating example procedures for polling STAs to solicit CF-ACK in accordance with various embodiments. As illustrated in FIG. 3, AP 102 may transmit a CF-Poll frame to a multicast address that identifies SDMA Group 1. It should be noted that polling procedures according to various embodiments may be achieved by use of any type of polling frames. Upon receiving the CF-Poll frame, STAs 106a and 106b from SDMA Group 1 reply with CF-ACK frames. The CF-ACK frames either may be sent sequentially or be transmitted using uplink SDMA. Upon receiving the CF-ACK frame, AP 102 replies with an ACK frame. Within the same TXOP, AP 102 may transmit another CF-Poll frame to another multicast address that identifies SDMA Group 2. As with the procedures performed by SDMA Group 1, in response to the CF-Poll frame, STAs 106c and 106d may transmit CF-ACK frames to AP 102. Thus, AP 102 may solicit CF-ACK frames from each of STAs 106a-106d from multiple SDMA groups.

Figure 5:
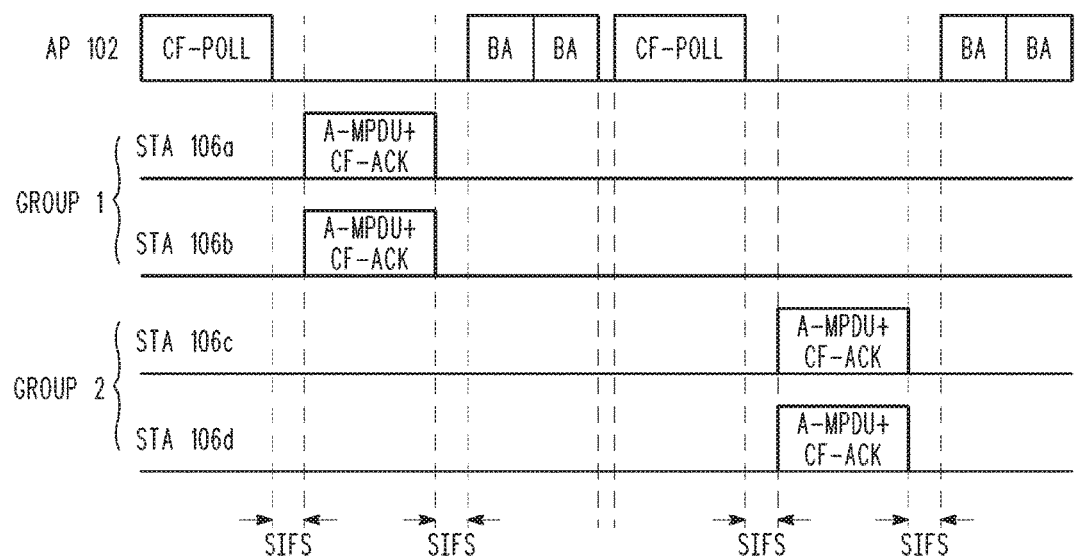
FIG. 5 is a timing chart illustrating example procedures for polling STAs for uplink data transmissions in accordance with various aspects of the present disclosure.

FIG. 5 illustrates a timing chart illustrating example procedures for polling STAs for uplink data transmissions in accordance with various aspects of the present disclosure. In this embodiment, AP 102 may transmit a CF-Poll frame with a multicast address that identifies SDMA Group 1. The CF-Poll frame may include in the TXOP Limit field a TXOP duration granted to SDMA Group 1. Thus, the TXOP duration may be granted commonly to STAs 106a and 106b belonging to same SDMA Group 1. In response to the CF-Poll frame, STAs 106a and 106b may transmit A-MPDU+CF-ACK frames simultaneously with each other using UL SDMA within the period indicated by the granted TXOP duration. Both of STAs 106a and 106b are required to transmit the A-MPDU+CF-ACK frames within the duration indicated by the received TXOP duration. Upon the receipt of the final (longest) uplink transmission from STAs 106a and 106b, AP 102 may reply with Block Acknowledgement (BA) to signify successful transmission of the A-MPDU+CF-ACK frames. The BA frames may be transmitted sequentially or simultaneously using a DL MU-MIMO transmission by separating the BA frames spatially or a DL OFDMA transmission by separating the BA frames in frequency. Subsequently, AP 102 may transmit another CF-Poll frame to STAs 106c and 106d from SDMA Group 2 using a multicast address. As with SDMA Group 1, STAs 106c and 106d may transmit A-MPDU+CF-ACK frames simultaneously with each other using UL SDMA. Thus, AP 102 may efficiently poll associated STAs from multiple SDMA groups for their uplink transmissions.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. An apparatus of an access point comprising: memory; and physical layer (PHY), and medium-access control (MAC) layer circuitry coupled to the memory, the PHY and MAC layer circuitry configured to:
contend for a wireless medium to receive exclusive control of the medium for a control period;
transmit a polling frame;
receive responses from at least two stations to the polling frame, wherein the responses each comprise an indication of a size of buffered data at the corresponding station of the at least two stations;
transmit a control transmission at the beginning of the control period, the control transmission to identify the at least two stations and a duration of the control transmission, wherein the duration is determined at least partially by the indication of the size of buffered data; and
receive simultaneously aggregate media access control protocol data units (A-MPDUs) that include data from the identified stations in accordance with a non-contention based multiple-access technique during the control period, wherein the A-MPDUs indicate an acknowledgement of the control transmission, and wherein the A-MPDUs are to be transmitted by the identified stations a short interframe space (SIFS) after the identified stations receive the control transmission.

2. The apparatus of claim 1 wherein the multiple-access technique used during the control period is a non-contention based multiple-access technique, and wherein the assess point is configured to communicate with stations outside the control period with a contention-based communication technique.

3. The apparatus of claim 1 wherein the control transmission includes timing information for the indicated stations to communicate with the access point during control period in accordance with the multiple-access technique.

4. The apparatus of claim 1 wherein the control transmission indicates channel resources for the indicated stations to communicate with the access point during control period in accordance with the multiple-access technique.

5. The apparatus of claim 1 wherein the multiple-access technique used during the control period is an orthogonal frequency division multiple access (OFDMA) technique.

6. The apparatus of claim 1 wherein the multiple-access technique used during the control period is a space-division multiple access (SDMA) technique.

7. The apparatus of claim 6 wherein during the control period, the access point is arranged to receive transmissions on non-orthogonal channel resources from at least some of the indicated stations in accordance with an uplink SDMA technique.

8. The apparatus of claim 6 wherein during the control period, the access point is arranged to transmit transmissions on non-orthogonal channel resources to at least some of the indicated stations in accordance with a downlink SDMA technique.

9. The apparatus of claim 1 wherein the MAC layer circuitry is configured to contend for the wireless medium during a contention period, and wherein the control period is a transmission opportunity (TXOP).

10. A communication station (STA) comprising: memory; and physical layer (PHY) and medium-access control (MAC) layer circuitry coupled to the memory, the PHY and MAC layer circuitry configured to:
receive a polling frame;
transmit a response to the polling frame with an indication of a size of buffered data at the STA;
receive, from an access point, a control transmission indicating a beginning of the control period, the control period comprising a transmission opportunity (TXOP), the control transmission to identify at least two stations, wherein the control transmission further comprises a duration of the control transmission; and
when the STA is identified in the control transmission, the STA is arranged to transmit an aggregate media access control protocol data unit (A-MPDU) that include data from the STA to the access point in accordance with a non-contention based multiple-access technique during the control period, wherein the A-MPDUs indicate an acknowledgement of the control transmission, and wherein the A-MPDU is to be transmitted by the STA a short interframe space (SIFS) after the reception of the control transmission, wherein during the control period, one or more other stations identified in the control transmission transmit other aggregate media access control protocol data units (A-MPDUs) that include data from the one or more other stations to the access point simultaneously with the STA in accordance with the non-contention based multiple-access technique.

11. The apparatus of claim 10 wherein the STA is configured to communicate with the access point outside the control period with a contention-based communication technique.

12. The apparatus of claim 10 wherein the control transmission includes timing information for the indicated stations to communicate with the access point during control period in accordance with the multiple-access technique.

13. The apparatus of claim 10 wherein the control transmission indicates channel resources for the indicated stations to communicate with the access point during control period in accordance with the multiple-access technique.

14. The apparatus of claim 10 wherein the multiple-access technique used during the control period is an orthogonal frequency division multiple access (OFDMA) technique.

15. The apparatus of claim 10 wherein the multiple-access technique used during the control period is a space-division multiple access (SDMA) technique.

16. The apparatus of claim 15 wherein during the control period, the STA is arranged to transmit uplink transmission on non-orthogonal channel resources concurrently with uplink transmissions from at least some of the indicated stations in accordance with an uplink SDMA technique.

17. A method performed by an apparatus of an access point comprising:
contending for a wireless medium to receive exclusive control of the medium for a control period;
transmitting a polling frame;
receiving responses from at least two stations to the polling frame, wherein the responses each comprise an indication of a size of buffered data at the corresponding station of the at least two stations;
transmitting a control transmission at the beginning of the control period, the control transmission to identify the at least two stations and a duration of the control transmission, wherein the duration is determined at least partially by the indication of the size of buffered data; and receiving simultaneously aggregate media access control protocol data units (A-MPDUs) that include data from the identified stations in accordance with a non-contention based multiple-access technique during the control period, wherein the A-MPDUs indicate an acknowledgement of the control transmission, and wherein the A-MPDUs are to be transmitted by the identified stations a short interframe space (SIFS) after the identified stations receive the control transmission.

18. The method of claim 17 wherein the multiple-access technique used during the control period is a non-contention based multiple-access technique, and wherein the assess point is configured to communicate with stations outside the control period with a contention-based communication technique.

19. The method of claim 17 wherein the control transmission includes timing information for the indicated stations to communicate with the access point during control period in accordance with the multiple-access technique.

20. The method of claim 17 wherein the control transmission indicates channel resources for the indicated stations to communicate with the access point during control period in accordance with the multiple-access technique.

21. The method of claim 17 wherein the multiple-access technique used during the control period is an orthogonal frequency division multiple access (OFDMA) technique.

22. The method of claim 17 wherein the multiple-access technique used during the control period is a space-division multiple access (SDMA) technique.

23. The method of claim 22 wherein during the control period, the access point is arranged to receive transmissions on non-orthogonal channel resources from at least some of the indicated stations in accordance with an uplink SDMA technique.

24. The method of claim 22 wherein during the control period, the access point is arranged to transmit transmissions on non-orthogonal channel resources to at least some of the indicated stations in accordance with a downlink SDMA technique.

25. The method of claim 17 wherein the MAC layer circuitry is configured to contend for the wireless medium during a contention period, and wherein the control period is a transmission opportunity (TXOP).

26. A method performed by a communication station (STA) comprising physical layer (PHY) and medium-access control (MAC) layer circuitry configured to:
receive a polling frame;
transmit a response to the polling frame with an indication of a size of buffered data at the STA;
receive, from an access point, a control transmission indicating a beginning of the control period, the control period comprising a transmission opportunity (TXOP), the control transmission to identify at least two stations, wherein the control transmission further comprises a duration of the control transmission and wherein the duration is determined at least partially by the indication of the size of buffered data; and
when the STA is identified in the control transmission, the STA is arranged to transmitting an aggregate media access control protocol data unit (A-MPDU) that include data from the STA to the access point in accordance with a non-contention based multiple-access technique during the control period, wherein the A-MPDUs indicate an acknowledgement of the control transmission, and wherein the A-MPDU is to be transmitted by the STA a short interframe space (SIFS) after the reception of the control transmission, wherein during the control period, one or more other stations identified in the control transmission transmit simultaneously with the STA other aggregate media access control protocol data units (A-MPDUs) that include data from the one or more other stations to the access point in accordance with the non-contention based multiple-access technique.

27. The method of claim 26 wherein the STA is configured to communicate with the access point outside the control period with a contention-based communication technique.

28. The method of claim 26 wherein the control transmission includes timing information for the indicated stations to communicate with the access point during control period in accordance with the multiple-access technique.

29. The method of claim 26 wherein the control transmission indicates channel resources for the indicated stations to communicate with the access point during control period in accordance with the multiple-access technique.

30. The method of claim 26 wherein the multiple-access technique used during the control period is an orthogonal frequency division multiple access (OFDMA) technique.

31. The method of claim 26 wherein the multiple-access technique used during the control period is a space-division multiple access (SDMA) technique.

32. The method of claim 31 wherein during the control period, the STA is arranged to transmit uplink transmission on non-orthogonal channel resources concurrently with uplink transmissions from at least some of the indicated stations in accordance with an uplink SDMA technique.

33. A non-transitory computer-readable storage medium that stores instructions for execution by one or more processors of an apparatus of an access point to perform operations comprising:
contending for a wireless medium to receive exclusive control of the medium for a control period;
transmitting a polling frame;
receiving responses from at least two stations to the polling frame, wherein the responses each comprise an indication of a size of buffered data at the corresponding station of the at least two stations;
transmitting a control transmission at the beginning of the control period, the control transmission to identify the at least two stations and a duration of the control transmission, wherein the duration is determined at least partially by the indication of the size of buffered data; and
receiving concurrently aggregate media access control protocol data units (A-MPDUs) that include data from the identified stations in accordance with a non-contention based multiple-access technique during the control period, wherein the A-MPDUs indicate an acknowledgement of the control transmission, and wherein the A-MPDUs are to be transmitted by the identified stations a short interframe space (SIFS) after the identified stations receive the control transmission.

34. The non-transitory computer-readable storage medium of claim 33 wherein the multiple-access technique used during the control period is a non-contention based multiple-access technique, and wherein the assess point is configured to communicate with stations outside the control period with a contention-based communication technique.

35. A non-transitory computer-readable storage medium that stores instructions for execution by one or more processors of a communication station (STA) to perform operations comprising:
  receive a polling frame;
  transmit a response to the polling frame with an indication of a size of buffered data at the STA;
  receive, from an access point, a control transmission indicating a beginning of the control period, the control period comprising a transmission opportunity (TXOP), the control transmission to identify at least two stations, wherein the control transmission further comprises a duration of the control transmission and wherein the duration is determined at least partially by the indication of the size of buffered data; and
  when the STA is identified in the control transmission, the STA is arranged to transmit an aggregate media access control protocol data unit (A-MPDU) that include data from the STA to the access point in accordance with a non-contention based multiple-access technique during the control period, wherein the A-MPDUs indicate an acknowledgement of the control transmission, and wherein the A-MPDU is to be transmitted by the STA a short interframe space (SIFS) after the reception of the control transmission, wherein during the control period, one or more other stations identified in the control transmission transmit simultaneously with the STA other aggregate media access control protocol data units (A-MPDUs) that include data from the one or more other stations to the access point in accordance with the non-contention based multiple-access technique.

36. The non-transitory computer-readable storage medium of claim 35 wherein the STA is configured to communicate with the access point outside the control period with a contention-based communication technique.

37. An apparatus of an access point comprising: memory; and physical layer (PHY) and medium-access control (MAC) layer circuitry coupled to the memory, the PHY and MAC layer circuitry configured to:
  transmit a polling frame;
  receive responses from at least two stations to the polling frame, wherein the responses each comprise an indication of a size of buffered data at the corresponding station of the at least two stations;
  transmit a control transmission identifying a control period and identifying the at least two stations, wherein the control transmission further comprises a duration of the control transmission, and wherein the duration is determined at least partially by the indication of the size of buffered data;
  receive simultaneously uplink transmissions of aggregate media access control protocol data units (A-MPDUs) through two or more antennas from the identified stations on non-orthogonal channel resources in accordance with an uplink space-division multiple access (UL-SDMA) technique during the control period, wherein the A-MPDUs indicate an acknowledgement of the control transmission, and wherein the A-MPDUs are to be transmitted by the identified stations a short interframe space (SIFS) after the identified stations receive the control transmission; and
  processing circuitry to separate the uplink transmissions received from each identified station.

38. The apparatus of claim 37 wherein prior to transmitting the control transmission, the access point is arranged to contend for a wireless medium to receive exclusive control of the medium for the control period, the control period being a transmission opportunity (TXOP), and wherein at least some of the uplink transmission that are transmitted by an identified station are transmitted using a single antenna.

39. The apparatus of claim 37 wherein the control transmission is a group polling frame indicating a time for uplink transmissions by the indicated stations.

40. The apparatus of claim 37 wherein the access point is further configured to transmit acknowledgement frames to acknowledge receipt of the uplink transmissions, wherein the acknowledge frame are transmitted in accordance with a downlink SDMA technique.

41. The apparatus of claim 37 wherein the control transmission is a group polling frame that indicates an order for the identified stations of a group are to respond with response frames, wherein the access point is further arranged to assign a remaining duration of a TXOP to the indicated stations for the uplink transmissions by transmitting a CF-Poll frame.

42. The apparatus of claim 41 wherein the response frames include an indication of buffered traffic for uplink transmission, the indication including at least one of a TXOP duration request and queue size, and wherein the access point is further configured to include the station within an indicated group of stations based on the indication of buffered traffic by transmitting the CF-Poll frame.

43. A method performed by an apparatus of an access point, the method comprising:
  transmitting a polling frame;
  receive responses from at least two stations to the polling frame, wherein the responses each comprise an indication of a size of buffered data at the corresponding station of the at least two stations;
  transmitting a control transmission identifying a control period and identifying the at least two stations, wherein the control transmission further comprises a duration of the control transmission, and wherein the duration is determined at least partially by the indication of the size of buffered data;
  receiving simultaneously uplink transmissions of aggregate media access control protocol data units (A-MPDUs) through two or more antennas from the identified stations on non-orthogonal channel resources in accordance with an uplink space-division multiple access (UL-SDMA) technique during the control period, wherein the A-MPDUs indicate an acknowledgement of the control transmission, and wherein the A-MPDUs are to be transmitted by the identified stations a short interframe space (SIFS) after the identified stations receive the control transmission; and
  processing to separate the uplink transmissions received from each identified station.

44. The method of claim 43 wherein prior to transmitting the control transmission, the method includes contending for a wireless medium to receive exclusive control of the medium for the control period, the control period being a transmission opportunity (TXOP), and wherein at least some of the uplink transmission that are transmitted by an identified station are transmitted using a single antenna.

45. The method of claim 43 wherein the control transmission is a group polling frame indicating a time for uplink transmissions by the indicated stations.

46. The method of claim 43 further comprising transmitting acknowledgement frames to acknowledge receipt of the uplink transmissions, wherein the acknowledge frame are transmitted in accordance with a downlink SDMA technique.

47. The method of claim 43 wherein the control transmission is a group polling frame that indicates an order for the identified stations of a group are to respond with response frames, wherein the method further comprises assigning a remaining duration of a TXOP to the indicated stations for the uplink transmissions by transmitting a CF-Poll frame.

48. The method of claim 47 wherein the response frames include an indication of buffered traffic for uplink transmission, the indication including at least one of a TXOP duration request and queue size, and wherein the method further comprises including the station within an indicated group of stations based on the indication of buffered traffic by transmitting the CF-Poll frame.

49. A non-transitory computer-readable storage medium that stores instructions for execution by one or more processors of an apparatus of an access point to configure the access point to perform operations comprising:
   transmitting a polling frame;
   receive responses from at least two stations to the polling frame, wherein the responses each comprise an indication of a size of buffered data at the corresponding station of the at least two stations;
   transmitting a control transmission identifying a control period and identifying the at least two stations, wherein the control transmission further comprises a duration of the control transmission, wherein the duration is determined at least partially by the indication of the size of buffered data;
   receiving simultaneously uplink transmissions of aggregate media access control protocol data units (A-MPDUs) through two or more antennas from the identified stations on non-orthogonal channel resources in accordance with an uplink space-division multiple access (UL-SDMA) technique during the control period, wherein the A-MPDUs indicate an acknowledgement of the control transmission, and wherein the A-MPDUs are to be transmitted by the identified stations a short interframe space (SIFS) after the identified stations receive the control transmission; and
   processing to separate the uplink transmissions received from each identified station.

50. The non-transitory computer-readable storage medium of claim 49 wherein prior to transmitting the control transmission, the access point is configured to contend for a wireless medium to receive exclusive control of the medium for the control period, the control period being a transmission opportunity (TXOP), and wherein at least some of the uplink transmission that are transmitted by an identified station are transmitted using a single antenna.

* * * * *